United States Patent [19]

Jones

[11] Patent Number: 5,467,557
[45] Date of Patent: Nov. 21, 1995

[54] WINDOW CONSTRUCTION AND METHOD OF MAKING THE SAME

[76] Inventor: Edgar W. Jones, 2757 Progress Park Dr., Stow, Ohio 44224

[21] Appl. No.: 167,670

[22] Filed: Dec. 15, 1993

[51] Int. Cl.⁶ ................................................ E06B 7/28
[52] U.S. Cl. ................... 49/171; 49/48; 49/147; 49/506
[58] Field of Search ............... 49/169, 171, 170, 49/147, 506, 507, 48; 160/116, 180

[56] References Cited

U.S. PATENT DOCUMENTS

| | | | |
|---|---|---|---|
| 254,247 | 2/1882 | Trono | D12/16 |
| 1,684,027 | 9/1928 | Hinman | 160/116 X |
| 1,721,223 | 7/1929 | Kern | 49/169 X |
| 1,746,518 | 2/1930 | Brennan | 49/48 |
| 1,814,477 | 7/1931 | McAllister | 49/48 |
| 2,555,204 | 5/1951 | Sorrell | 49/147 |
| 3,690,299 | 9/1972 | Johnson | 49/169 X |
| 3,770,312 | 11/1973 | Shadburn | 296/28 C |
| 3,990,186 | 11/1976 | Gebhard | 49/393 |
| 4,014,069 | 3/1977 | Walker | 16/140 |
| 4,119,341 | 10/1978 | Cook | 296/146 |
| 4,124,054 | 11/1978 | Spretnjak | 160/90 |
| 4,384,376 | 5/1983 | Shrode | 49/169 X |
| 4,671,013 | 6/1987 | Friese et al. | 49/380 |
| 4,839,989 | 6/1989 | McConnell | 49/171 |
| 5,309,860 | 5/1994 | Shearer | 49/147 X |

FOREIGN PATENT DOCUMENTS

| | | | |
|---|---|---|---|
| 961299 | 4/1957 | Germany | 49/171 |

*Primary Examiner*—Philip C. Kannan
*Attorney, Agent, or Firm*—Renner, Kenner, Greive, Bobak, Taylor & Weber

[57] ABSTRACT

According to the invention, a window (11) having an aperture (40) therein also includes a moveable, secondary window assembly (10) mounted on one side of the window aperture (40), such that the secondary window assembly (10) is moveable from a position closing the window aperture (40) to a position wherein the window aperture (40) is at least partially open. The secondary window assembly (10) includes a frame member (20), a secondary window (26) mounted within the frame member (20), and mounting means (41, 42, 51) for mounting the frame member (20) upon the window 11. The mounting means (41, 42, 51) includes at least one flexible hinge pin (41) affixed to the frame member (20) and positioned through a hinge pin aperture (42) through the window (11).

16 Claims, 4 Drawing Sheets

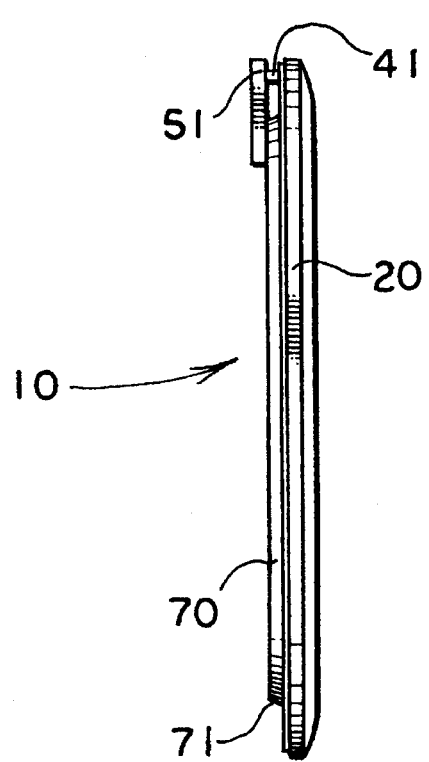
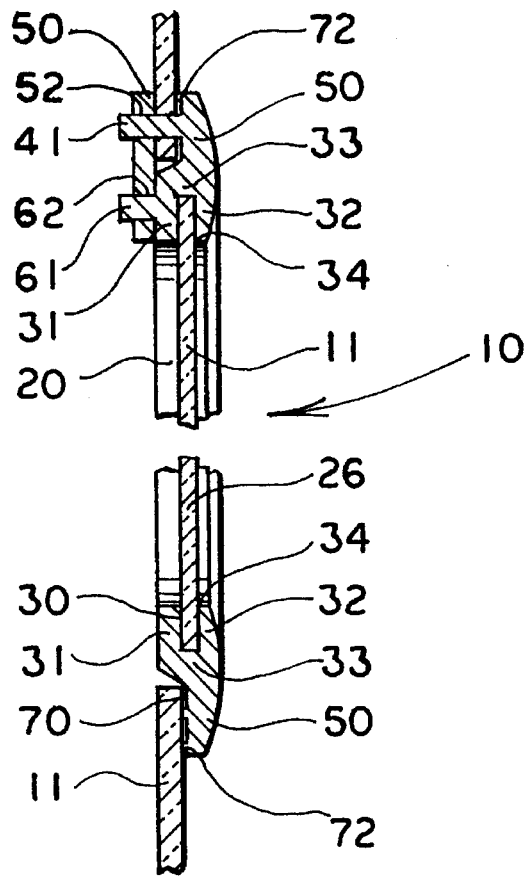
FIG. 4  FIG. 5
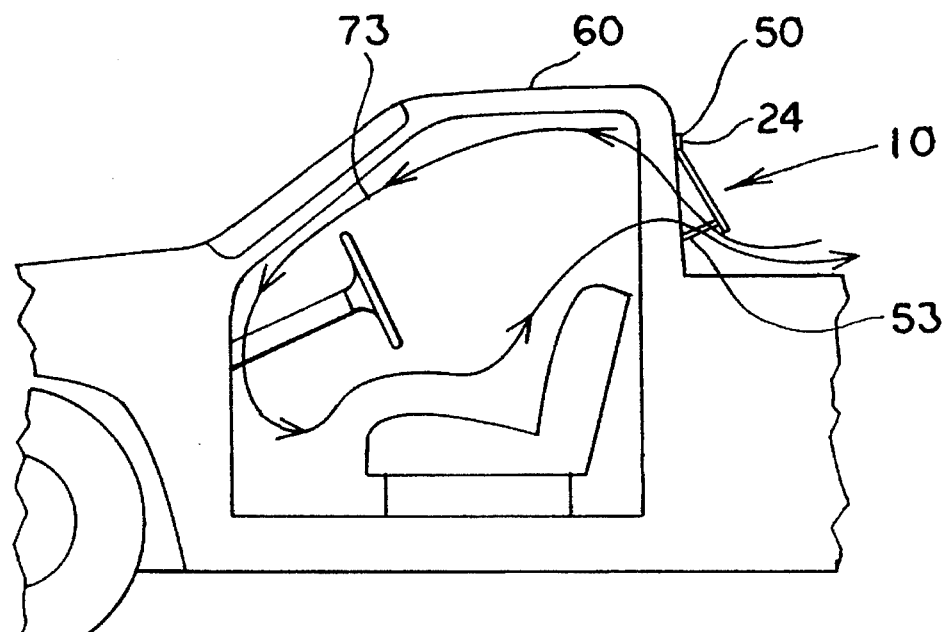
FIG. 6

WINDOW CONSTRUCTION AND METHOD OF MAKING THE SAME

TECHNICAL FIELD

This invention relates to a window having a secondary window therein. More particularly, the present invention relates to a window having an aperture therein, and a secondary window assembly mounted to the window to selectively close the aperture in the window. The invention also relates to a method of providing a window with a secondary window assembly.

BACKGROUND OF THE INVENTION

Window assemblies are commonly used when it is desired to selectively provide ventilation to a given area. For example, the windows of a building can be opened or closed, often by sliding within a track, to provide a flow of air from the outside to the interior of the building. Likewise, it is often the case that automobiles or the like are provided with windows which are moveable to allow a flow of air into the vehicle.

With respect to many windows, such as automotive back windshields and the like, it is not practical or desirable to move the entire window to promote ventilation. In such circumstances, secondary windows are often provided to allow such ventilation. For example, in pick-up truck cab back windows, it has been known to provide a sliding window therein. In actuality, it has been common practice to provide two back windows with the sliding members positioned therebetween. Such windows have been found to be ineffective in providing a thorough ventilation of the truck cab, and further, have also been found to be deficient in preventing dirt and other debris from entering the cab.

It has also been found that it is difficult to provide an existing window already positioned within a building, an automobile or the like, with a secondary ventilation window. Such would normally require extensive modification to the building or automobile itself.

A need exists therefore for an improved secondary window positionable within an existing window, without the need for modifying the structure supporting the existing structure.

SUMMARY OF INVENTION

It is therefore, an object of the present invention to provide a window with a secondary window.

It is another object of the present invention to provide a secondary window assembly.

It is still another object to provide a method for providing a window with a secondary window assembly therein.

At least one or more of the foregoing objects, together with the advantages thereof over the known art relating to window assemblies, which shall become apparent from the specification which follows, are accomplished by the invention as hereinafter described and claimed.

In general the present invention provides in combination with a window having an aperture therein, a moveable, secondary window assembly mounted on one side of the window aperture, such that said secondary window assembly is moveable from a position closing the window aperture to a position wherein the window aperture is at least partially open. The secondary window assembly comprises a frame member, a secondary window mounted within the frame member, and mounting means for mounting the frame member to the window. The mounting means includes at least one flexible hinge pin affixed to the frame member and is positioned through a hinge pin aperture through the window.

The present invention also comprises in combination with a window, an aperture within the window such that the aperture is bounded on all sides by the window; and, a secondary window assembly positioned to selectively close the aperture.

The present invention also includes a method for providing a window with a secondary window therein, which method comprises cutting an aperture within the window; and, mounting a secondary window assembly proximate to the aperture and on one side of the window.

BRIEF DESCRIPTION OF THE DRAWINGS

FIG. 4 is a side elevational view of the secondary window assembly of FIG. 3;

FIG. 5 is a close-up, partially broken, sectional view taken along line 5—5 of FIG. 3;

FIG. 6 is a side perspective view of an exemplary truck cab having a secondary window assembly according to the invention mounted to the rear window thereof, and showing a flow of air therethrough by arrows; and, FIG. 7 is a perspective, exploded view showing an embodiment of the present invention as mounted to a window shown in a broken away manner.

PREFERRED EMBODIMENT FOR CARRYING OUT THE INVENTION

Figure 1:
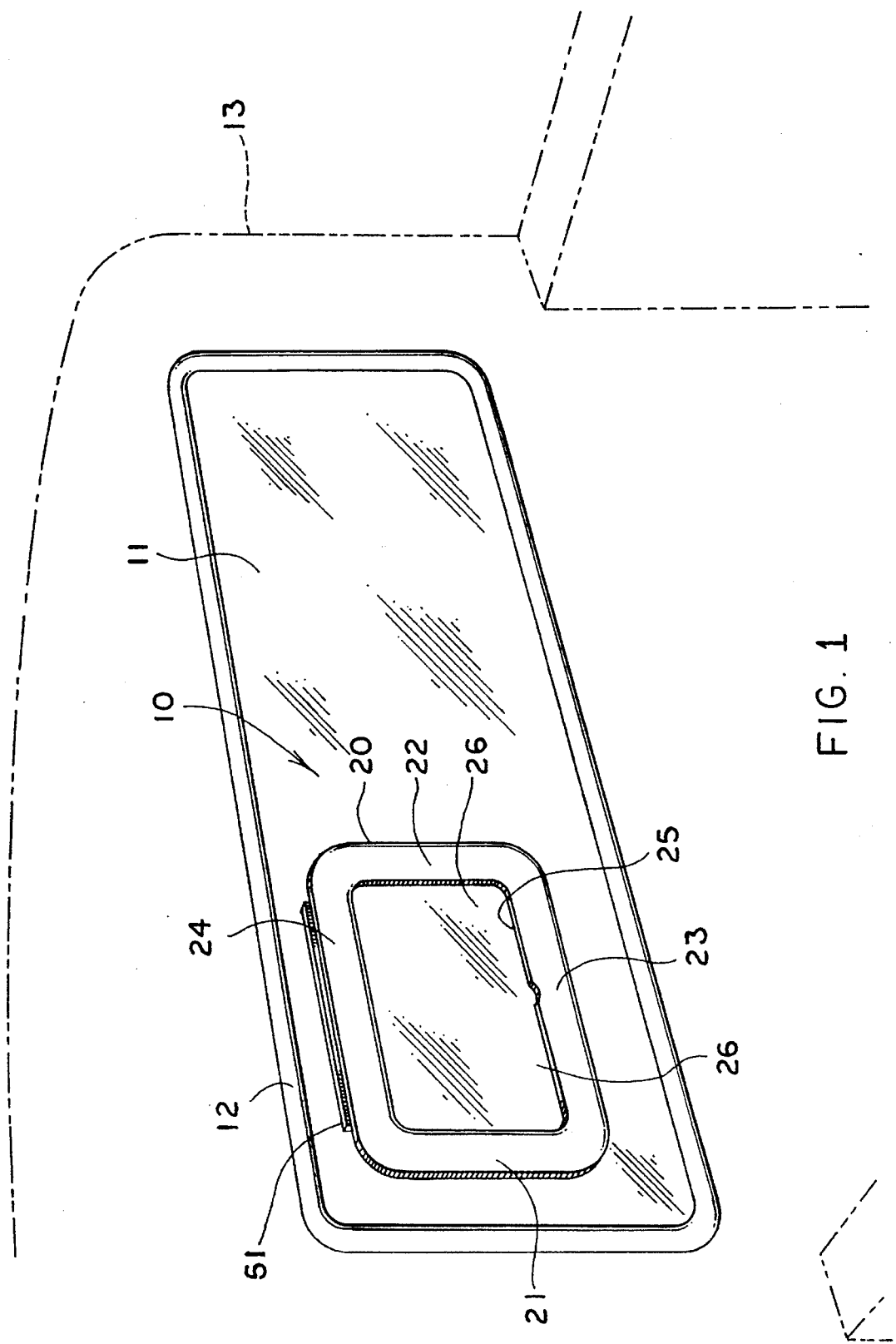
FIG. 1 is a perspective view of a secondary window assembly mounted to a window, with a truck cab being partially shown in phantom lines for environmental purposes.

A moveable, secondary window assembly according to the concepts of the present invention is generally indicated by the number 10 on the attached drawings. By "moveable" it is understood to mean that secondary window assembly 10 can be selectively moved between an opened and a closed position, as will be more fully discussed hereinbelow. By "secondary" window assembly, it is understood to mean that the window assembly 10 according to the invention is employed with a window, such as an existing window 11 as shown in FIG. 1. An example of an "existing" window is a window that is already mounted by use of a window frame 12 in a structure such as a truck cab 13 shown in phantom lines in FIG. 1.

By "existing" it is not intended to convey that the secondary window assembly 10 according to the invention is only provided in a window that is already in place within a structure. The secondary window assembly 10 according to the present invention can be installed in a window at the time of the window's manufacture, or it can be installed after the window is installed in a structure, such as truck cab 13.

Further, by "window" as used herein, it is understood to mean a glass, plexiglass or similar conventional window material. The invention has particular application to glass windows.

Figure 2:
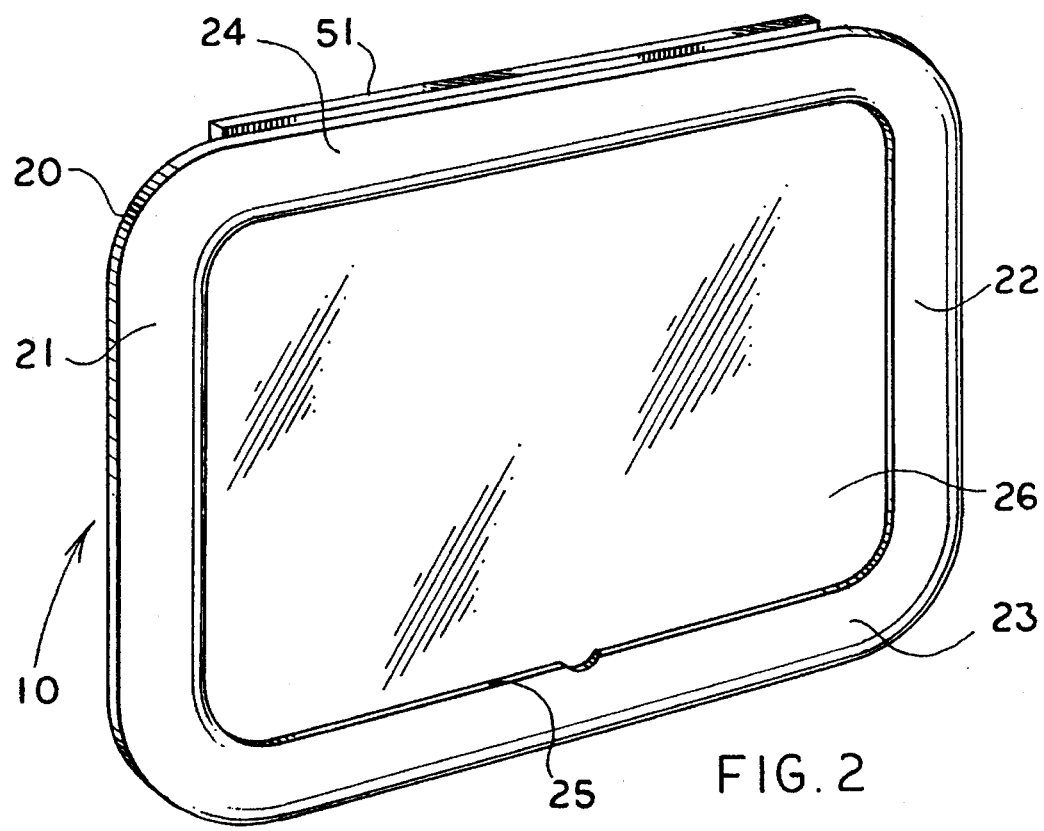
FIG. 2 is a perspective, close-up, front view of the secondary window assembly of FIG. 1.
Figure 3:
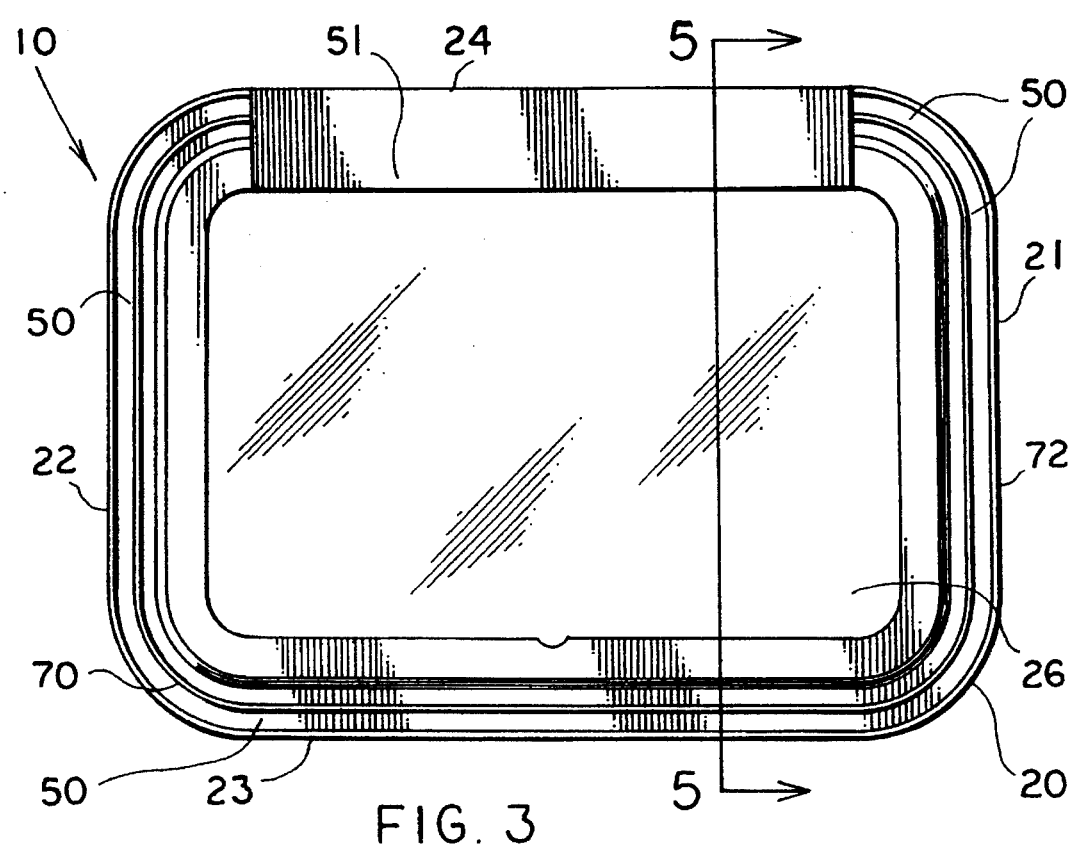
FIG. 3 is a rear elevational view of the secondary window assembly of FIG. 2.

As shown in FIG. 2, secondary window assembly 10 is preferably rectangular and provided with a frame member 20 having a first pair of opposing sides 21 and 22, generally positioned at right angles to a second pair of opposing sides 23 and 24. Also preferably, sides 21, 22, 23 and 24 are disposed in the same plane. Sides 21, 22, 23 and 24 define an open area 25 therebetween, wherein a secondary window 26 is placed, as will be further described hereinbelow.

Secondary window 26 is preferably affixed to frame member 20. One preferred manner in which this is accomplished is by providing each side 21, 22, 23 and 24 with a U-shaped channel 30 (FIG. 5). Each U-shaped channel 30 has an inner leg 31, an outer leg 32, a connecting arm 33, and an open end 34 opposite connecting arm 33.

U-shaped channel 30 is disposed upon frame member 20, such that its open end 34 is proximate to open area 25 of frame member 20. Further, each U-shaped channel 30 is contiguous with each U-shaped channel of an adjacent side 21, 22, 23 or 24. That is, U-shaped channel 30 is substantially continuous from one side 21, 22, 23 or 24 to the next. Secondary window 26 is of such a configuration that it is receivable within continuous U-shaped channel 30.

Secondary window 26 may be held in place within channel 30 by friction fit, adhesive bonding, both or the like. Preferably, frame member 20 is formed from a flexible elastomeric material such as natural rubber, synthetic rubber, mixtures thereof and the like, such that channel 30 can be flexed (not shown) to allow insertion of secondary window 26 therein.

It will be appreciated that channel 30 need not necessarily be U-shaped, and that channel 30 need not necessarily be continuous, so long as it has sufficient surface area to securely hold secondary window 26 in place covering open area 25 of frame member 20, as will be appreciated by one skilled in the art.

Frame member 20 with secondary window 26 is preferably hingedly affixed to window 11, to cover an aperture 40 therein (FIG. 7), as will be further described hereinbelow. Aperture 40 may be formed within window 11 at the time of its manufacture, or it may be cut in window 11 at a later time. To cut aperture 40 in window 11, it is preferred to employ a high pressure water stream having a preselected grit or particulate matter within the water. An example of a device which will cut glass in this manner is a water jet machine commercially available from various cutting machine manufacturers. This device employs a stream of water at a pressure of about 60,000 pounds/square inch forced trough a nozzle having a diameter of about 1/32 inch. It is preferred that aperture 40 be bounded on all sides thereof by window 11. That is, preferably aperture 40 is positioned within window 11.

Figure 7:
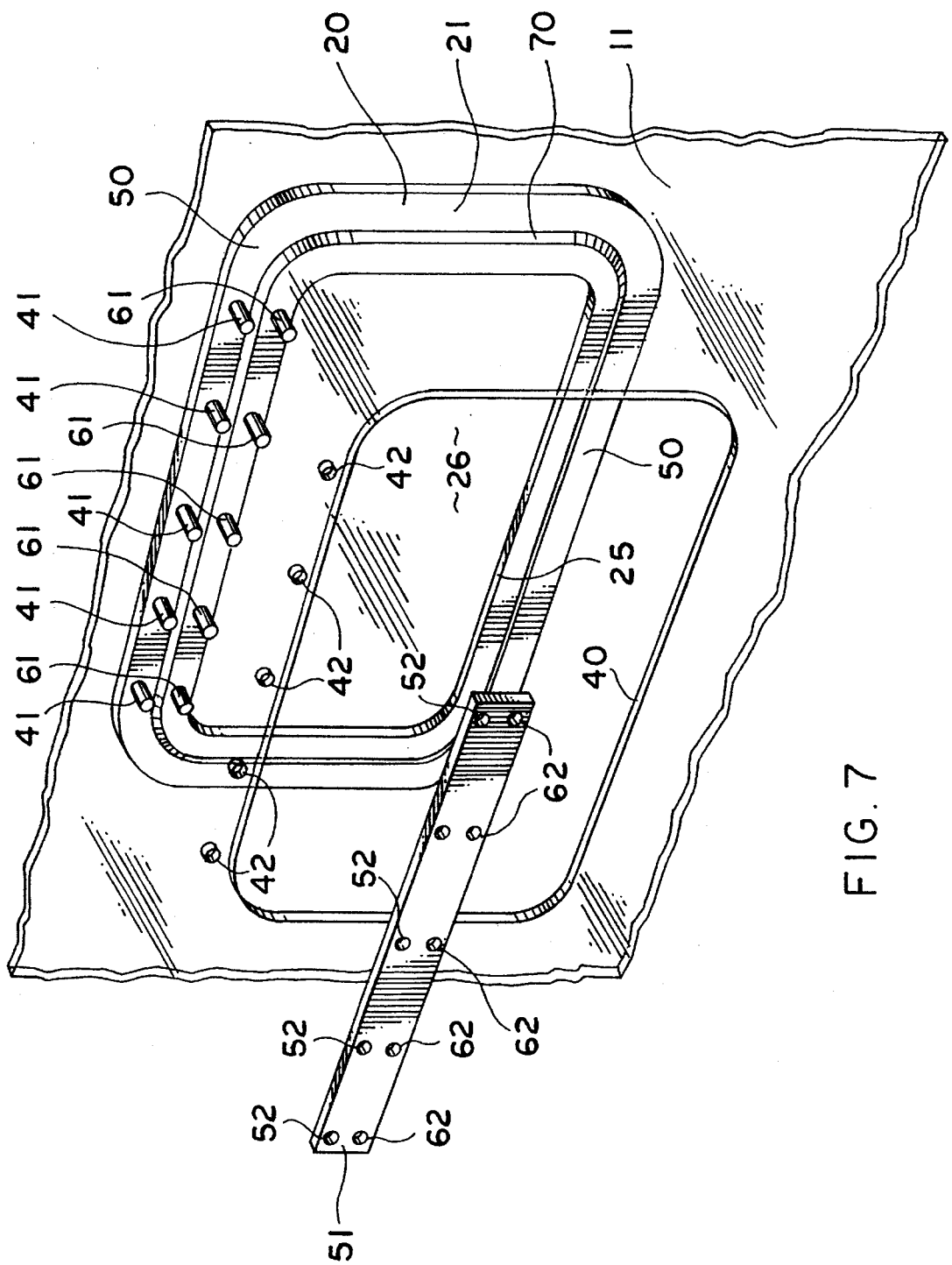

As stated hereinabove, frame member 20 with secondary window 26 is preferably hingedly affixed to window 11, to cover aperture 40 therein (FIG. 7). While any means of affixing frame member 20 to window 11 is within the scope of the invention, one preferred method includes a at least one and preferably a plurality of flexible, primary hinge pins 41 extending from one side of frame 20, such as side 24. A plurality of mounting apertures or hinge pin apertures 42 are provided through window 11, such that each hinge pin 41 is receivable within a hinge pin aperture 42.

It is further preferred that a plurality of primary hinge pins 41 are integrally formed with frame member 20, such that they are disposed thereon in a spaced parallel relation, as depicted in the drawings (FIG. 7). Similarly, it is preferred that a plurality of hinge pin apertures 42 are provided through window 11 in a manner complimentary to the parallel spaced relation of the plurality of primary hinge pins 41.

Frame member 20 may be provided with peripheral flange 50, which flange 50 may be employed to carry hinge pins 41 (FIG. 5). Flange 50 need not necessarily be continuous about the periphery of frame member 20. Further, by "carry" it is understood to mean that primary hinge pins 41 are affixed to flange 50 or integrally formed therewith such that they are attached thereto. Flange 50 may be formed such that outer leg 32 extends therefrom, as depicted in FIG. 5.

A hinge pin mounting plate 51 is also provided, and is positioned on the opposite side of window 11 as frame member 20, as shown in FIG. 7. Hinge pin mounting plate 51 is preferably affixed to each hinge pin 41, such as by adhesive bonding or the like. Also preferably, hinge pin plate 51 is provided with hinge plate primary hinge pin apertures 52 arranged in a complimentary spaced parallel relation to hinge pin apertures 42, such that primary hinge pins 41 are receivable therein. By use of hinge pin plate 51, window 11 is positioned between frame member 20 side 24, and hinge pin plate 51, as shown in FIGS. 4 and 5. Because primary hinge pins 41 are positioned through hinge pin apertures 42 through window 11, frame member 20 is effectively affixed to window 11.

As stated hereinabove, it is preferred that frame member 20 be formed from a resilient material. It is also preferred that primary hinge pins 41 be integrally formed with frame member 20, such that they too are resilient and hence, flexible. Further still, peripheral flange 50 may also be integrally formed therein, such that it too has a degree of flexibility.

As shown in FIG. 1, frame member 20 may be provided in a closed position, such that aperture 40 in window 11 is effectively closed. By moving side 23 of frame member 20 away from window 11, frame member 20 is caused to flex, such as at peripheral flange 50 as depicted in FIG. 6. Primary hinge pins 41 and hinge pin plate 51 may also be flexed somewhat in this open position, and frame member 20 may be propped in the open position by a prop member 53. Prop member 53 may be of any design, such as an elongate structure as depicted in FIG. 6, wherein one end engages frame member 20 and the other engages the support structure for window 11, such as vehicle 60.

Frame member 20 may also be provided with a plurality of secondary hinge pins 61, also arranged in a spaced parallel relation. One preferred configuration of the invention includes secondary hinge pins 61 spaced from primary hinge pins 41, such that secondary hinge pins 61 pass through aperture 40 when frame member 20 is affixed to window 11, as is depicted in FIG. 5. Hinge pin plate 51 may be provided with a plurality of secondary hinge pin apertures 62, such that secondary hinge pins 61 are receivable therein in a manner similar to hinge plate primary hinge pin apertures 52 receiving primary hinge pins 41, as was described hereinabove.

The length of primary hinge pins 41 and secondary hinge pins 61, and the depth of hinge plate primary hinge pin apertures 52 and secondary hinge pin apertures 61, may be configured such that primary hinge pins 41 and secondary hinge pins 62 pass completely through hinge plate 51, as shown in FIG. 5. Further, hinge pins 41 and 62 may be flush with hinge plate 51 or not pass therethrough, as equally represented in FIG. 4. Any combination thereof is within the scope of the invention. Similarly, hinge pins 41 and 62 need not necessarily be evenly spaced as depicted in the drawings, although such is preferred.

Frame member 20 preferably will restrict the passage of air through aperture 40 when in the closed position as depicted in FIG. 1. One preferred means of accomplishing this fit is to provide a sealing flange 70 extending from frame member 20 in a direction generally similar to primary hinge pins 41 (FIG. 4). As shown in FIG. 5, when frame member is moved to the closed position, sealing flange 70 is impinged between frame member 20 and window 11, thus effecting the air tight fit as desired. In the closed position, sealing flange 70 "engages" or physically touches window 11. In order to facilitate the impingement, it is preferred that sealing flange 70 extend from frame member 20 at an angle with respect thereto, as shown in FIG. 4 at portion 71 of sealing flange 70.

Peripheral flange 50 may terminate in a lip 72, also extending from frame member 20 in a direction generally similar to primary hinge pins 41, such that lip 72 also engages window 11, as shown in FIG. 5.

With reference to FIG. 6, when frame member 20 is in the open position, air can enter the structure to which window 11 is attached, as for example, vehicle 60. It has been unexpectedly found that when frame member 60 is positioned upon a vehicle 60, such that frame member 20 is affixed thereto at side 24 as discussed hereinabove, air will enter vehicle 60 through aperture 40 as depicted by continuous arrow 73, circulate about vehicle 60, and exit through aperture 40. However, rain water and much dirt and debris is prevented from entering vehicle 60 by the positioning of frame member 20.

A method according to the invention includes providing window 11 with secondary window 26 therein, by cutting aperture 40 within window 11 as was discussed hereinabove. The method also includes mounting secondary window assembly 10 proximate to aperture 40 and on one side of the window 11, in a manner as also described hereinabove.

Thus it should be evident that the device and methods of the present invention are highly effective in providing a secondary window construction for a window. The invention is particularly suited for vehicle windows, but is not necessarily limited thereto.

Based upon the foregoing disclosure, it should now be apparent that the use of the secondary window assembly described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. In combination with a window having an aperture therein:

a moveable, secondary window assembly mounted on one side of the window aperture, such that said secondary window assembly is moveable from a position closing the window aperture to a position wherein the window aperture is at least partially open;

said secondary window assembly comprising a frame member, a secondary window mounted within said frame member, and mounting means for mounting said frame member upon the window;

said mounting means including at least one flexible hinge pin affixed to said frame member and positioned through a hinge pin aperture through the window.

2. The combination, as set forth in claim 1, wherein said frame member comprises resilient sealing flange means extending therefrom and engageable with the window when said secondary window assembly is in a position closing the window aperture.

3. The combination, as set forth in claim 1, wherein said mounting means includes a mounting plate having at least one aperture therein and positioned on the other side of the window, such that said at least one hinge pin is positionable through said hinge pin aperture and through said aperture in said mounting plate.

4. The combination, as set forth in claim 3, wherein said at least one hinge pin is made from a resilient rubber material.

5. The combination, as set forth in claim 4, wherein said mounting plate is made from said resilient rubber material.

6. The combination, as set forth in claim 5, wherein said frame member is made from said resilient rubber material.

7. The combination, as set forth in claim 3, wherein said mounting means includes a plurality of said hinge pins in spaced parallel relation.

8. The combination, as set forth in claim 7, wherein said frame member comprises two pair of opposing sides, wherein each side of each said pair is in a parallel spaced relation to the other said side, and wherein each said pair of opposing sides is generally at a right angle to the other said pair of opposing sides which are adjacent thereto; said opposing sides forming an open area therebetween.

9. The combination, as set forth in claim 8, wherein said secondary window is positioned within said open area.

10. The combination, as set forth in claim 9, wherein each said side of said frame member is provided with a channel which is contiguous with said channel of each adjacent said side; such that said secondary window is positioned within said channel.

11. The combination, as set forth in claim 8, wherein said mounting means further comprises a plurality of secondary hinge pins extending therefrom such that said secondary hinge pins extend through the window aperture.

12. The combination, as set forth in claim 11, wherein said mounting plate further comprises a plurality of secondary hinge pin apertures, such that said secondary hinge pins are positionable therethrough.

13. A method for providing a window with a secondary window therein, comprising:

cutting an aperture within said window; and, mounting a secondary window assembly proximate to said aperture and on one side of the window;

wherein said mounting a secondary window assembly includes cutting at least one mounting aperture through the window.

14. A method, as set forth in claim 13 wherein said step of cutting an aperture within said window includes cutting said window with a high pressure water jet having particulate material therein.

15. A method, as set forth in claim 13, wherein said step of mounting a secondary window assembly further includes positioning a flexible hinge pin within said mounting aperture.

16. A method, as set forth in claim 15, wherein said step of mounting a secondary window assembly further includes affixing a mounting plate to said hinge pin on the other side of the window.

* * * * *